United States Patent [19]

Hunkar

[11] 4,240,996
[45] Dec. 23, 1980

[54] PROCESS FOR CONTROLLING PART DENSITY IN FAST INJECTION MOLDING MACHINES

[75] Inventor: Denes B. Hunkar, Cincinnati, Ohio

[73] Assignee: Hunkar Laboratories, Inc., Cincinnati, Ohio

[21] Appl. No.: 28,100

[22] Filed: Apr. 9, 1979

[51] Int. Cl.³ ............................................. B29F 1/06
[52] U.S. Cl. ................................... 264/40.1; 425/149
[58] Field of Search ...................... 426/149; 264/40.1

[56] References Cited

U.S. PATENT DOCUMENTS

| | | | |
|---|---|---|---|
| 3,767,339 | 10/1973 | Hunkar | 425/149 X |
| 3,860,801 | 1/1975 | Hunkar | 425/149 X |
| 3,932,083 | 1/1976 | Boettner | 425/149 X |

*Primary Examiner*—Thomas P. Pavelko
*Attorney, Agent, or Firm*—Wood, Herron & Evans

[57] ABSTRACT

A process for controlling part density in molding machines in which a charge of material is injected by a ram into the mold cavity in approximatey 1.5 seconds or less as the ram moves between a variable retraction point and a fixed forward point whereat the ram bottoms, i.e., reaches its forwardmost point of travel beyond which further forward motion is precluded by mechanical limits or stops. Means are included to determine the pressure of the material injected into the mold cavity, using a pressure transducer communicating with the cavity, runner or barrel, at the point in time when the ram bottoms. The measured pressure is then compared against a predetermined pressure correlated to a desired part density, and in response thereto an error signal generated. The error signal is utilized to vary the ram traction point such that the next charge will return the cavity pressure, when the ram tip bottoms, toward the predetermined or desired pressure and in turn return the density of the injected charge toward the desired density notwithstanding changes in density from charge-to-charge.

12 Claims, 1 Drawing Figure

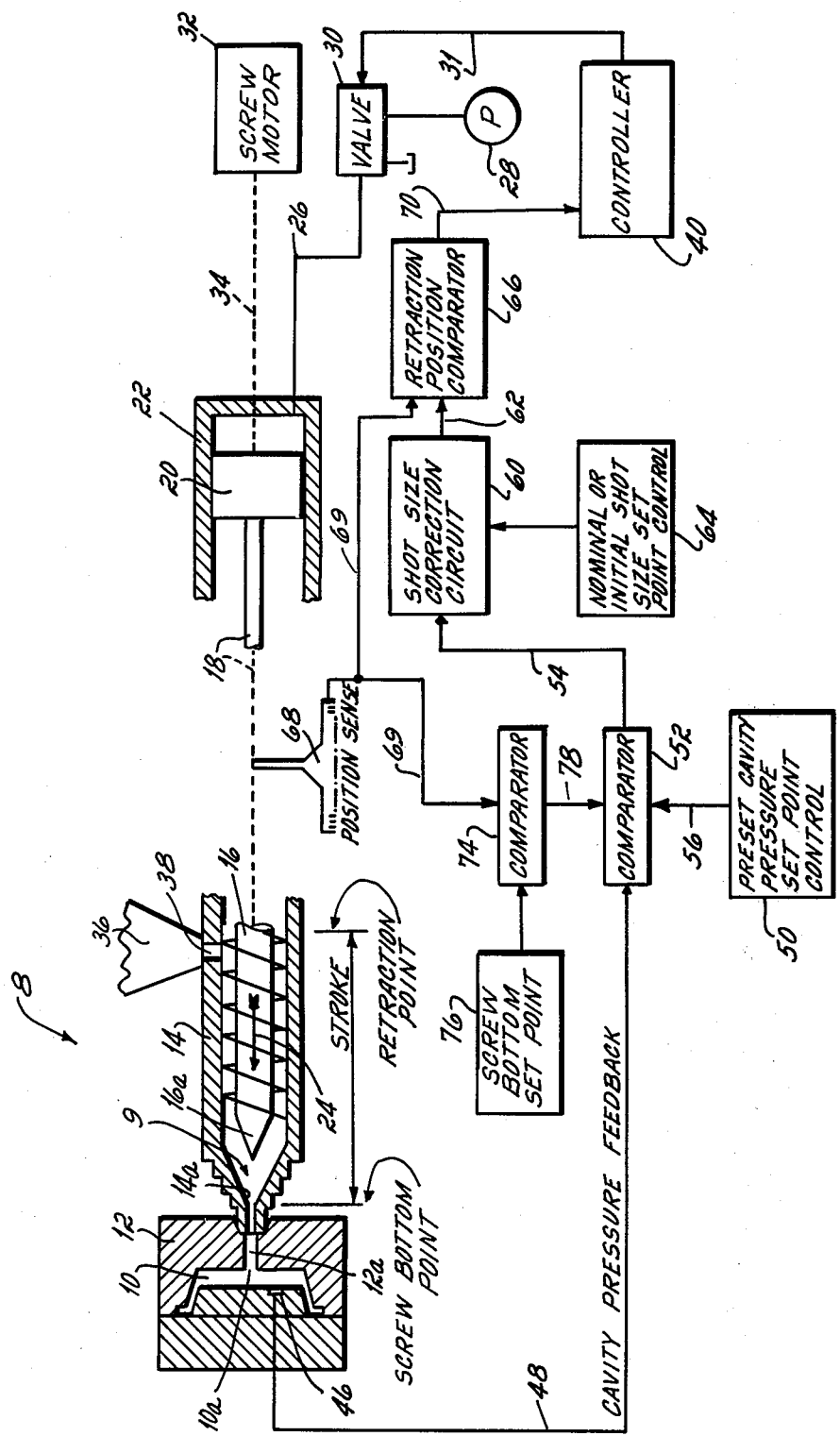

PROCESS FOR CONTROLLING PART DENSITY IN FAST INJECTION MOLDING MACHINES

BACKGROUND OF THE INVENTION

This invention relates to injection molding and more particularly to a process of producing molded parts of uniform density under varying material density conditions with a fast injection molding machine in which the ram bottoms at the conclusion of an injection stroke lasting approximately 1.5 seconds or less.

"Fast injecting molding" differs from normal injection molding in two distinct respects. First, the time interval necessary to complete the injection stroke, during which time the charge of material is injected into the mold cavity by a ram, is on the order of approximately 1.5 seconds or less, with injection intervals of 0.5 seconds or less being common. This is in contrast to a normal injection molding process in which the stroke interval to accomplish injection of the charge into the mold cavity typically takes 3–30 seconds or more. Second, in fast injection molding, due to ram inertia and the high speed achieved by the ram during a relatively short injection stroke interval, the ram bottoms out at the conclusion of each stroke, i.e., the ram tip reaches a forward limit of travel beyond which further forward motion is precluded by mechanical stops or limits, concluding ram advancement and terminating the injection stroke.

In molding parts of thermoplastic, thermoset, powdered metals and/or powdered ceramics, whether using conventional molding techniques or fast injection molding, it is always desirable to achieve uniformity in part weight from cycle-to-cycle. This is often difficult particularly when the density of the material being injected is varying in an unpredictable manner by reason of the evaporation of additives, uncontrolled variations in material temperature, ratio of regrind to virgin material and composition, and the like. Heretofore, a variety of approaches have been utilized to achieve uniform part density in molding processes of the conventional type (vis-a-vis fast injection molding). Unfortunately, due to the drastically different nature of fast injection molding, particularly the bottoming of the ram at the conclusion of the injection cycle, which typically takes approximately 1.5 seconds or less, the techniques found successful in conventional injection molding are incapable of providing uniform part density in fast injection molding.

Uniform part weight, an important consideration in conventional molding, is vastly more critical and important in fast injection molding. In fast injection molding, if insufficient material is injected into the mold when the ram bottoms and the injected material cools and shrinks, sink marks or voids in the molded product will occur. This is because the bottomed ram is incapable of supplementing the initially injected charge with additional material to compensate for part skrinkage as cooling occurs. If too much material is injected into the mold cavity, the mold will flash, and the flash will have to be trimmed from the molded part leaving undesirable surface imperfections where the flash were removed. These underpacking and overpacking conditions also affect the molded part weight and shrinkage, leading to dimensional instability and waste of material.

SUMMARY OF THE INVENTION

Accordingly, it has been an objective of this invention to provide a process for fast injection molding which provides parts of uniform density notwithstanding unpredictable variations in material density. This has been accomplished in accordance with the principles of this invention by providing, in one preferred form of the invention, a process which includes (a) introducing material into the injection barrel forward of the ram tip; (b) retracting the ram to a specified retraction point to accumulate a specified amount of material between the ram tip and the forward end of the barrel; (c) advancing the ram in a forward direction through a full stroke until the ram bottoms in the barrel to thereby inject into the mold cavity a charge of material, with ram advance being at a speed designed to achieve a full injection stroke in approximately 1.5 seconds or less; (d) measuring the pressure of the injected material at the end of the stroke when the ram bottoms in the barrel; (e) comparing the measured pressure at the end of the stroke against a preset pressure correlated to a desired charge of predetermined mass and developing an error signal correlated to the difference therebetween; and (f) automatically modifying the ram retraction point, and hence the length of the stroke, in response to the error signal, thereby returning the measured cavity pressure at the end of the stroke toward the preset cavity pressure, in turn restoring the mass of the successive charge toward the desired mass notwithstanding variations in material density from charge-to-charge.

In a perferred form of the invention, ram advance to inject the charge is accomplished in approximately 0.7 seconds or less, and the pressure of the material injected into the cavity measured when the ram bottoms is determined by measuring the pressure of the material in the cavity with a transducer which communicates with the cavity.

In accordance with a further form of the invention, a predetermined amount of material is introduced into the barrel forward of the ram and, depending upon the difference between the desired and actual pressure of the injected material when the ram bottoms, the amount of material introduced into the barrel at the start of the next cycle will be modified to restore the mass of the next charge toward the desired value.

An important advantage of this invention, attributable particularly to the fact that cavity pressure is measured when the ram bottoms, is that the cavity pressure measurement is made under constant volume conditions, i.e., the volume of material on which the pressure measurement is made is constant from cycle-to-cycle. With cavity pressure measured under conditions of constant volume, variations in cavity pressure are attributable solely to variations in material density. Under such circumstances, modification of the ram retraction point, to inject more or less material and thereby restore the cavity pressure to a predetermined level correlated to a desired molded part mass, can be readily and reliably achieved.

These and other advantages, features, and objectives of the invention will become more readily apparent from a description of the drawings in which the single FIGURE is a schematic diagram of the control circuitry and the associated elements of an injection molding machine.

With reference to the FIGURE, certain principal elements of an injection molding machine 8 are shown for injecting material 9 into the cavity 10 of a mold 12. The molding machine includes a hollow barrel 14 within which reciprocates a selectively rotatable ram or screw 16. Connected to the rear end of the screw 16 via a suitable shaft 18 is a piston 20 located within a hydraulic cylinder 22. Injection movement of the screw 16 in the direction of arrow 24 is achieved by introducing pressurized fluid into the hydraulic cylinder 22 via a line 26 from a pressure fluid source 28 under control of an appropriate valve means 30 which is responsive to control signals on line 31 from a controller 40. Rotation of the screw 16 to plasticate material prior to injection is accomplished under the control of a screw motor 32 which is drivingly connected to the piston 20 as shown schematically by the dotted line connection 34. The pressure under which the material is plasticated when the screw 16 rotates is controlled by controller 40. A hopper 36 communicating at its lower end with the interior of the barrel 14 via a suitable opening 38 permits gravity feed of molding material into the barrel.

As noted, a charge of material is accumulated forward of the injection tip 16a, prior to injection into the mold cavity 10, as the screw is rotated by motor 32 under a back pressure applied to the hydraulic cylinder 22 established by controller 40 which cooperates with the valve 30. As the screw 16 rotates, the material, assuming it is thermoplastic, is mechanically worked, causing it to become molten or plasticized. In addition to plasticizing the material, the rotating screw also advances the plastic material in a forward direction as a result of the auger action of the rotating screw. The advancing material accumulates forward of the tip 16a of the screw 16, causing the screw to retract against the hydraulic back pressure. When the screw reaches a predetermined rearward position, known as the retraction point, screw rotation is usually, although not necessarily, terminated and the ram advanced by hydraulic pressure to the cylinder 22 with the valve 30 under control of the controller 40. As the screw 16 advances, the charge of material which was accumulated forward of the ram tip 16a during the plasticate phase of the cycle is injected into the mold cavity 10.

When injection is concluded, which takes approximately 1.5 seconds or less, the ram 16 bottoms in the barrel 14. At this point, the ram effectively seals the mold passage or runner 12a between the forward end 14a of the barrel or nozzle 14b and the orifice 10a which constitutes the opening to the mold cavity 10 through which material enters the mold cavity from the runner 12a. Subsequent to screw bottoming, hydraulic pressure in the cylinder 22 is maintained at a level sufficient to prevent rearward motion of the bottomed screw, thereby substantially preventing back flow of material from the cavity 10. Such pressure is maintained until the material in the runner 12a or the cavity gates freezes at which point back flow from the cavity 10 is substantially prevented without aid of pressurizing the bottomed screw. As used in the specification and claims, the term "ram bottoms" means that the ram has reached its forward limit of travel beyond which further forward motion is precluded by mechanical stops or limits of the injection machine. In most fast injection machines when the ram bottoms, the forward tip 16a of the ram is proximate the forward end of the barrel, i.e., the ram tip will be spaced very close to, but not in actual contact with, the forward end of the barrel 14a thereby avoiding damage to the ram.

During injection, the screw 16 moves through a stroke between a retraction point and a screw bottom point. The material injected into the cavity 10 during screw advance from the retraction point to the screw bottom point constitutes the injected charge. To maintain the mass or density of the injected charge constant from cycle-to-cycle notwithstanding variations in density of the material being injected, the retraction point is varied in accordance with variations in density, with the retraction point being moved closer and further relative to the screw bottom point as the density increases and decreases, respectively.

To obtain a measurement correlated to the density of injected material which can then be used to determine the direction and extent of modification of the retraction point for the succeeding injection stroke, the pressure of the injected material is measured when the screw bottoms, that is, at the point in time when the ram cannot move further forward due to mechanical stops or limits which is coincident with the screw tip 16a substantially reaching the barrel wall 14a. The measured pressure of the injected material is then compared with a preset pressure correlated to desired mass or density of the molded part. If the pressure of the material injected into the cavity 10 at the instance the screw bottoms is less than the preset cavity pressure, insufficient material has been injected and the retraction point is adjusted further away from the screw bottom point such that during injection of the next charge, more material will be injected. Conversely, if the measured pressure of the injected material at the point of screw bottoming is greater than the preset cavity pressure, too much material has been injected in which case the retraction point will be moved towards the screw bottom point such that during the next stroke, less material will be injected into the cavity.

To accomplish the foregoing pressure measurement and comparison, and retraction point modification in response thereto, a pressure sensor 46 is provided, preferably in communication with the mold cavity. The pressure sensor 46 provides a signal on line 48 correlated to the pressure in the cavity. To facilitate comparing the cavity pressure on line 48 with a preset cavity pressure correlated to a desired part density established by suitable pressure setpoint control 50, a comparator 52 is provided. The comparator 52 provides on its output line 54 an error signal correlated to the difference between the actual cavity pressure and the preset cavity pressure input on lines 48 and 56, respectively. The cavity pressure error on line 54 is input to a shot size correction circuit 60 which modifies, either increases or decreases, the retraction point signal output on line 62 relative to an initial or nominal retraction point or shot size determined by a set point control 64.

The corrected retraction point signal on line 62 is input to a retraction position comparator 66 which has as its other input on line 69 the output of a screw position transducer 68. When the actual position of the screw as determined by the position transducer 68 equals the modified retraction point determined by the shot size correcting circuit 60, a signal is provided on line 70 to the controller 40 for terminating rearward movement of the screw 16. At this point in the cycle the desired charge for the next injection cycle has been accumulated forward of the ram tip 16a, and control of the valve 30 by the controller 40 is switched from back pressure to injection pressure and at the proper time the charge injected into the mold cavity in the manner discussed previously.

To facilitate sampling of the cavity pressure at the exact point in time when the screw bottoms, a position comparator 74 is provided which is responsive to the screw position transducer 68 and a screw bottom position setpoint control 76. When the actual position of the screw tip 16a, as determined by the position transducer 68, coincides with the screw position bottom signal determined by setpoint control 76, comparator 74 provides a pressure sampling control signal on line 78 to the pressure comparator 52. The sampling control signal on line 78 causes the comparator 52 to sample the output of the pressure sensor 46 on line 48 and compare it against the preset cavity pressure setpoint from control 50 to produce the cavity pressure error signal 54 which modifies the retraction point in a manner previously described.

While the pressure transducer 46 is shown in the FIGURE in direct communication with the cavity 10, it may be located to communicate with the runner 12a or any point in the nozzle forward of the bottomed ram tip 16a. In pin-gated molds, that is, molds having an extremely small orifice and correspondingly large pressure drops thereacross, it has been found advantageous to measure the pressure of the injected material with a transducer in direct communication with the mold cavity. However, under other circumstances where the pressure in the nozzle forward of the bottom screw tip or in the runner 12a reasonably accurately reflects the pressure in the mold cavity 10, the pressure transducer may be located such that it is in direct communication with the runner 12a or with the nozzle forward of the bottomed screw tip.

During injection, the hydraulic pressure and/or flow in the cylinder 22 is selected under control of the controller 40 such that the entire injection stroke will be achieved in approximately 1.5 seconds or less, preferably in approximately 0.7 seconds or less. With injection stroke intervals of such small proportions, high injection velocities are achieved for the screw. High screw injection velocities coupled with the substantial inertia of the screw itself cause the screw tip 16a to bottom against the forward end 14a of the barrel, which bottoming cannot be avoided in practice. With the screw bottomed, the barrel 14 is substantially sealed relative to the mold cavity and runner system. Under such circumstances, measurement of the pressure of the injected material at the instant of screw bottoming occurs under constant volume conditions, that is, under conditions in which the volume of material on which the pressure measurement is made is constant from measurement to measurement. The volume is constant from cycle-to-cycle by reason of the fact that ram bottoming occurs every cycle at the same point in the barrel, and the volume forward of this point, which includes the spacing between ram tip 16a and barrel surface 14a, the runners, gates and cavities, is constant from cycle-to-cycle. With the volume constant from measurement to measurement, variation in cavity pressure can only be attributable to variations in mass or density of injected material. Accordingly, by modifying the retraction point in accordance with the deviation of measured injected material pressure at the point of screw bottoming from a set point is a reliable and accurate way of maintaining uniform part mass or density notwithstanding variations in density of injected material.

Details of the injection molding machine and associated circuitry, both electrical and hydraulic, for accomplishing plasticization of the material under a controlled back pressure, injection of the material under an injection pressure, sampling of the cavity pressure when the ram reaches a preset forward position, in this case when the ram screw bottoms, have not been described in detail. Suitable apparatus and circuitry is shown in U.S. Pat. No. 3,860,801 assigned to the assignee of the present invention. Similarly, details of the circuitry for adjusting the retraction point as a function of the difference between a measured pressure and a preset pressure have also not been provided. Such can be constructed in accordance with the principles of U.S. Pat. No. 3,860,801. The disclosure of U.S. Pat. No. 3,860,801 is specifically incorporated herein by reference.

While the invention has been described in connection with an injection molding machine of the reciprocating screw type in which, for example, thermoplastic material is injected, the invention has equal utility in other molding processes such as transfer molding and the like. For example, instead of varying the retraction point of a machine with a selectively variable stroke dependent on measured pressure deviation from a desired value when the ram bottoms to thereby vary the amount of material introduced on the next cycle into the barrel forward of the ram tip, it is possible using a fixed stroke machine to vary the amount of material introduced forward of the ram tip from cycle-to-cycle dependent on the difference between the measured pressure of the injected material and a preset pressure.

The process of the invention is also useful with other materials such as thermosets, powdered ceramics, powdered metals, etc. Finally, the process of the invention can be implemented using hardware, i.e., specially designed control circuits incorporating standard circuit modules, such as comparators and the like, as shown in the FIGURE, or alternatively can be implemented with software, i.e., a specially programmed general purpose computer, minicomputer, or microcomputer.

Having described the invention, what is claimed is:

1. A method of charging, with a uniform mass of material, a molding cavity having an orifice which communicates, via a mold passage, with an injection barrel in which a ram reciprocates under control of a drive means between a fixed forward position, whereat the ram bottoms with its tip proximate the forward end of the barrel and a variable retracted position, said method comprising:
   introducing material into said barrel;
   retracting said ram to a specified retraction point to provide a specified amount of material between said ram tip and the forward end of said barrel;
   advancing said ram in a forward direction through a full stroke until said ram bottoms with its tip proximate the forward end of said barrel to thereby inject into said mold cavity via said mold orifice and passage a charge of material equal in mass to said specified amount, said ram advance being at a speed designed to complete said full stroke in approximately 1.5 seconds or less;
   measuring the pressure of said injected material at the end of said stroke when said ram bottoms;
   comparing the measured cavity pressure at the end of said stroke against a preset desired cavity pressure correlated to a desired charge of predetermined mass and developing an error signal correlated to the difference therebetween; and automatically modifying said specified retraction point, and hence the length of said stroke, in response to said error signal to return said measured cavity pressure at the end of said stroke toward said preset desired cavity pressure and in turn restore the successive charge toward said desired charge of predetermined mass notwithstanding variations in material density from charge-to-charge.

2. The method of claim 1 wherein said advancing step is at a speed designed to complete said full stroke in approximately 0.7 seconds or less.

3. The method of claim 1 wherein said introducing step includes introducing material from the class of thermoplastics, thermosets, powdered metals, and/or powdered ceramics.

4. The method of claim 1 wherein said measuring step includes measuring the pressure with a transducer communicating with said cavity.

5. The method of claim 1 wherein said measuring step includes measuring the pressure with a transducer communicating with said mold passage.

6. The method of claim 1 wherein said measuring step includes measuring the pressure with a transducer communicating with said barrel forward of said bottomed screw tip.

7. A method of charging, with a uniform mass of material, a mold cavity having an orifice which communicates, via a mold passage, with an injection barrel in which a ram reciprocates under control of a drive means through a stroke of fixed length between a fixed forward position, whereat the ram bottoms with the forward tip of the ram proximate the forward end of the barrel, and a fixed retracted position, said method comprising:

introducing a specified amount of material into said barrel forward of said ram tip;

advancing said ram in a forward direction through a full stroke of fixed length until said ram bottoms with its tip proximate the forward end of said barrel to thereby inject into said mold cavity via said mold orifice and passage a charge of material equal in mass to said specified amount, said ram advance being at a speed designed to complete said full stroke in approximately 1.5 seconds or less;

measuring the pressure in said cavity at the end of said stroke when said ram bottoms;

comparing the measured cavity pressure at the end of said stroke against a preset desired cavity pressure correlated to a desired charge of predetermined mass and developing an error signal correlated to the difference therebetween; and automatically modifying said specified amount of material introduced into said barrel forward of said ram tip in response to said error signal to return said measured cavity pressure at the end of said fixed length stroke toward said preset desired cavity pressure and in turn restore the successive charge toward said desired charge of predetermined mass notwithstanding variations in material density from charge to charge.

8. The method of claim 7 wherein said advancing step is at a speed designed to complete said full stroke in approximately 0.7 seconds or less.

9. The method of claim 7 wherein said introducing step includes introducing material from the class of thermoplastics, thermosets, powdered metals, and/or powdered ceramics.

10. The method of claim 7 wherein said measuring step includes measuring the pressure with a transducer communicating with said cavity.

11. The method of claim 7 wherein said measuring step includes measuring the pressure with a transducer communicating with said mold passage.

12. The method of claim 7 wherein said measuring step includes measuring the pressure with a transducer communicating with said barrel forward of said bottomed screw tip.

* * * * *